United States Patent [19]

Okado

[11] 4,403,280
[45] Sep. 6, 1983

[54] COMMUTATION CONTROL DEVICE FOR CURRENT TYPE INVERTERS

[75] Inventor: Chihiro Okado, Fuchu, Japan

[73] Assignee: Tokyo Shibaura Denki Kabushiki Kaisha, Kanagawa, Japan

[21] Appl. No.: 374,746

[22] Filed: May 4, 1982

[30] Foreign Application Priority Data

May 12, 1981 [JP] Japan .................................. 56-71255

[51] Int. Cl.³ ...................... H02P 13/18; H02M 1/06
[52] U.S. Cl. ...................................... 363/96; 363/138
[58] Field of Search ................ 363/96, 135, 136, 137, 363/138

[56] References Cited

U.S. PATENT DOCUMENTS

| | | | |
|---|---|---|---|
| 4,039,926 | 8/1977 | Steigerwald | 363/138 |
| 4,183,081 | 1/1980 | Cutler et al. | 363/138 X |
| 4,309,751 | 1/1982 | Okado | 363/138 |
| 4,330,817 | 5/1982 | Avar et al. | 363/138 X |

Primary Examiner—William M. Shoop
Attorney, Agent, or Firm—Stevens, Davis, Miller & Mosher

[57] ABSTRACT

In a commutation control device for a current type inverter, a device for detecting voltage of a commutation capacitor and a device for controlling a charging interval of the capacitor are provided. The voltage detecting device includes a comparator, while the charging interval control device includes a timing pulse generator, a circuit for delaying a pulse delivered from a pulse generator, and a timing signal generator which delivers a timing signal adapted to control a discharge interval of the commutation capacitor for restricting the voltage thereof in a predetermined range.

6 Claims, 10 Drawing Figures

COMMUTATION CONTROL DEVICE FOR CURRENT TYPE INVERTERS

BACKGROUND OF THE INVENTION

This invention relates to a commutation control device for a current type inverter including a forced commutation circuit, which is adapted to stably drive an AC motor or the like.

The current type inverter is an inverter wherein a commutation energy in a load such as an electric motor is stored in a capacitor, and the stored energy is used for the subsequent commutation.

Figure 1:
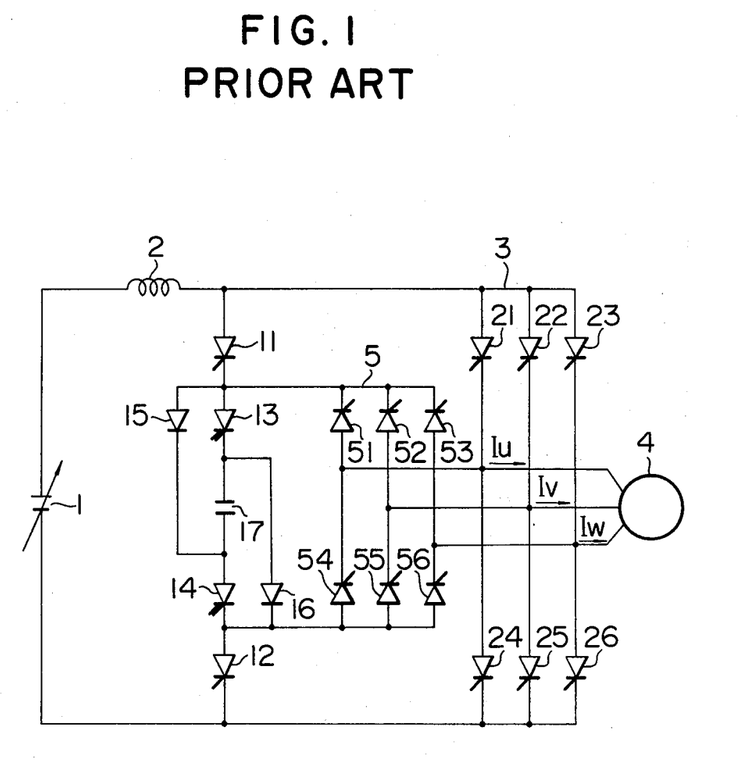
FIG. 1 is a circuit diagram of a conventional current type inverter having an AC motor as its load.

An example of a conventional current type inverter is illustrated in FIG. 1.

In this example, an electric current supplied from a variable DC source 1 and smoothed out by a DC reactor 2 is converted by a main thyristor bridge 3 comprising thyristors 21-26 into three phase currents which are supplied to a load 4 such as an AC motor. The example further includes an auxiliary thyristor bridge 5 comprising thyristors 51 through 56, additional thyristors 11 and 12, choppers 13 and 14, and diodes 15 and 16 which connect a capacitor 17 across the DC side of the auxiliary thyristor bridge 5 when the choppers 13 and 14 are turned OFF. The variable DC power source 1 may be of a type including a phase-controlled rectifying bridge connected to a three-phase AC power source. The choppers 13 and 14 may be made of gate turn off thyristors, transistors, or thyristors.

Figure 2:
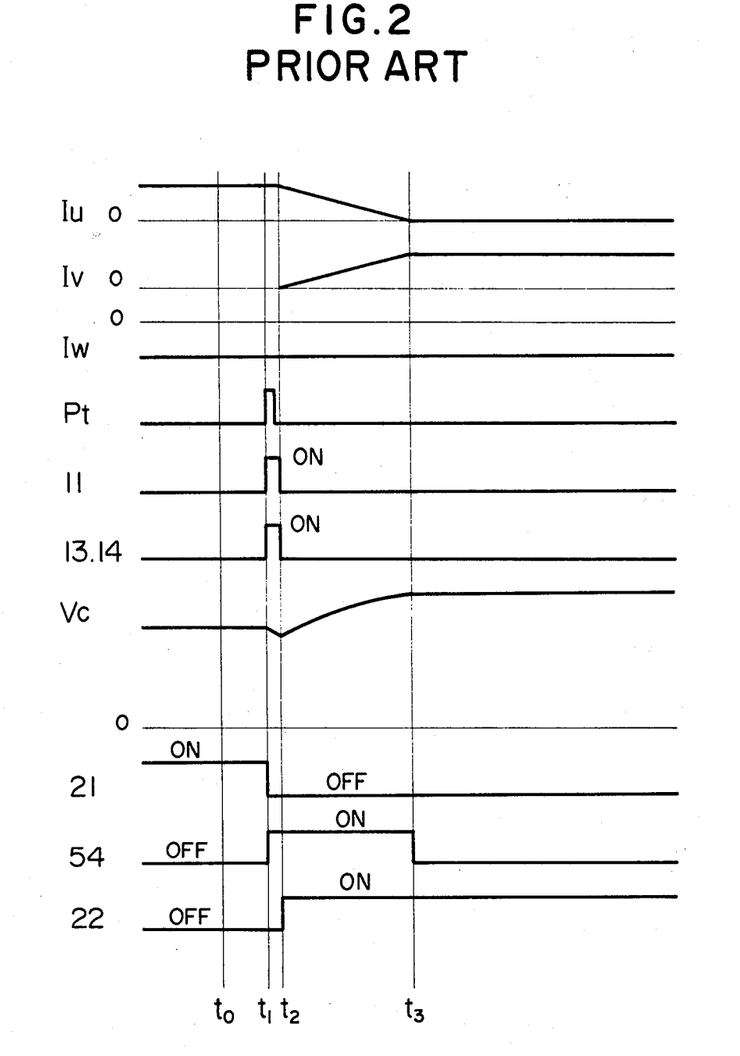
FIG. 2 is a timing chart for explaining the operation of the inverter shown in FIG. 1.
Figure 3A:
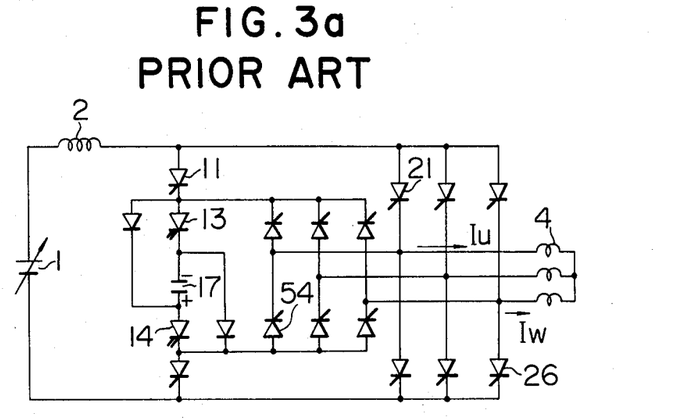

The operation of this conventional inverter will be described with reference to FIGS. 2, 3($a$), 3($b$) and 3($c$).

Assuming that the thyristors 21 and 26 are ON at a time instant $t_0$, electric currents $I_U$ and $I_W$ flow through the motor 4. When a commutation timing pulse $P_t$ is generated at an instant $t_1$, the thyristor 11, choppers 13 and 14, and a thyristor 54 in the auxiliary thyristor bridge 5 are all turned ON. Thus, a reverse voltage is applied to the thyristor 21 to turn OFF the same. The current $I_U$ now changes its passage from the thyristor 21 to the thyristor 54 as shown in FIG. 3($a$). During the interval $t_1$-$t_2$, an electric current flows from the DC power source 1 through a loop comprising the reactor 2, thyristor 11, chopper 13, capacitor 17, chopper 14, thyristor 54, electric motor 4, and the thyristor 26, thereby discharging the capacitor 17.

Figure 3B:
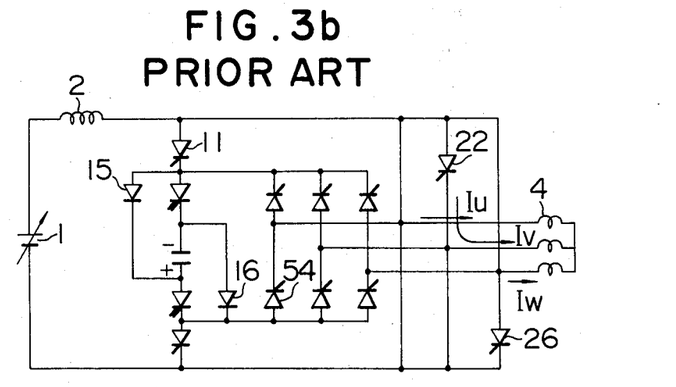
Figure 3C:
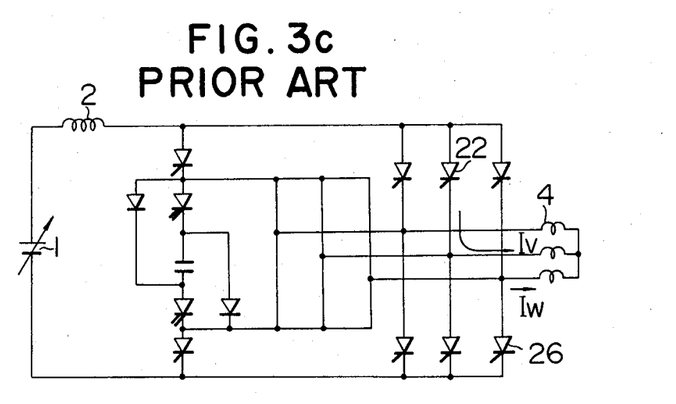

When the choppers 13 and 14 are turned OFF and the thyristor 22 is turned ON at the end of the interval $t_1$-$t_2$ of a sufficient length for turning OFF the thyristor 21, the electric current $I_U$ attenuates because its direction is opposite to that of the voltage $V_C$ across the capacitor 17, while the current $I_V$ increases as shown in FIG. 3($b$) because it flows directly from the power source 1. The commutation, that is a transfer operation from the current $I_U$ to the current $I_V$, completes as shown in FIG. 3($c$) at an instant $t_3$.

The voltage $V_C$ of the capacitor 17 decreases during the interval $t_1$-$t_2$ due to the discharge of the capacitor 17, and increases during the interval $t_2$-$t_3$ due to the charging of the capacitor. When the voltage $V_C$ becomes high, the variation rates of the currents $I_U$, $I_V$ increase, thus reducing the interval $t_2$-$t_3$ so as to reduce the increasing rate of the voltage $V_C$.

The rate of decreasing the voltage $V_C$ during the interval $t_1$-$t_2$ is constant for a constant load current. Thus, when the interval $t_1$-$t_2$ is constant, the voltage $V_C$ is brought into a constant value at the instant $t_2$.

However, when the load condition varies, the voltage $V_C$ at the instant $t_2$ also varies from the constant value. For instance, when the load increases, the voltage $V_C$ also increases which is applied to the motor 4 at the time of commutation thus increasing surge voltage. Conversely, when the voltage $V_C$ decreases below the back electromotive force of the electric motor 4, the current $I_U$ in FIG. 3($b$) will not recuce to zero, thus resulting in a commutation failure.

SUMMARY OF THE INVENTION

A primary object of the present invention is to provide a commutation control device for a current-type inverter, wherein all of the aforementioned drawbacks of the conventional control device can be substantially overcome.

Another object of the invention is to provide a commutation control device for a current-type inverter, wherein commutation can be effected successfully regardless of the load condition.

Still another object of the invention is to provide a commutation control device for a current-type inverter, wherein application of a surge voltage to the load can be substantially eliminated.

These and other objects of the present invention can be achieved by providing a commutation control device for a current type inverter of a type wherein commutation energy of a load of the inverter is stored in a capacitor, and subsequent commutation is effected utilizing discharge of the capacitor wherein the control device comprises means for detecting a voltage across the capacitor when it is charged and means for controlling a discharge interval of the capacitor during the subsequent commutation depending on the detected capacitor voltage so as to maintain the capacitor voltage at a substantially constant range.

BRIEF DESCRIPTION OF THE DRAWINGS

In the accompanying drawings:

FIGS. 3($a$), 3($b$) and 3($c$) are circuit diagrams useful to explain the operation of the inverter shown in FIG. 1;

DESCRIPTION OF PREFERRED EMBODIMENTS

Figure 4:
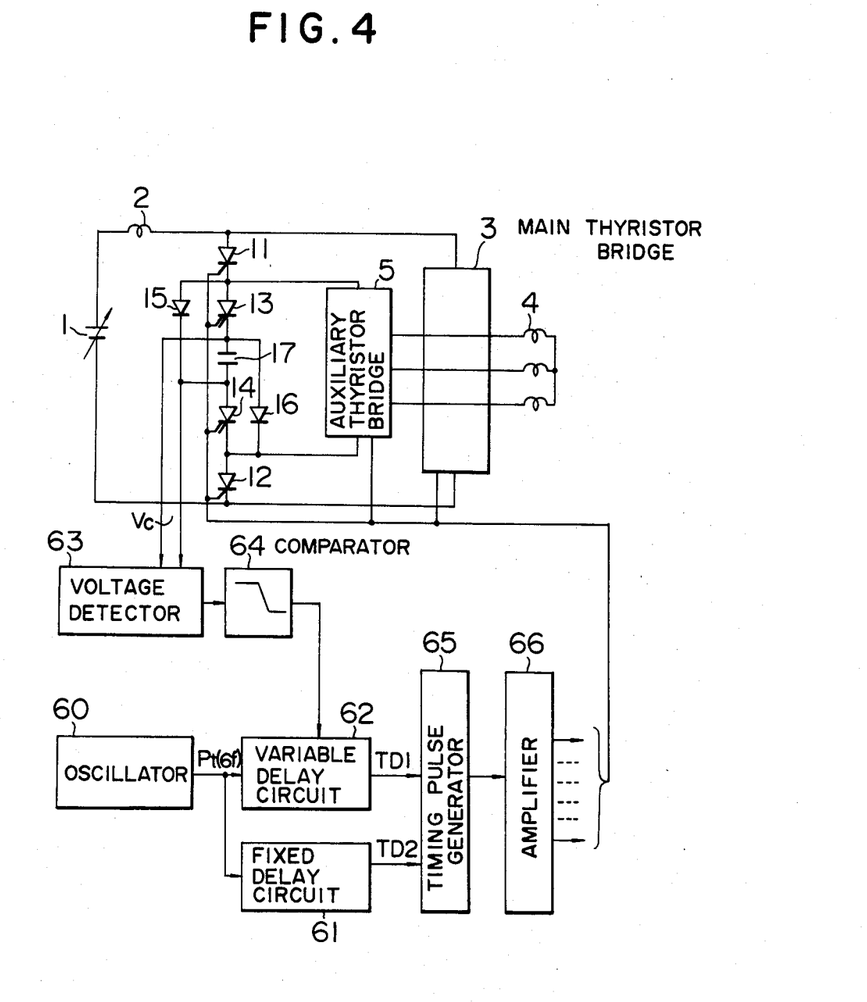
FIG. 4 is a block diagram showing a current type inverter constituting an embodiment of the present invention.
Figure 5:
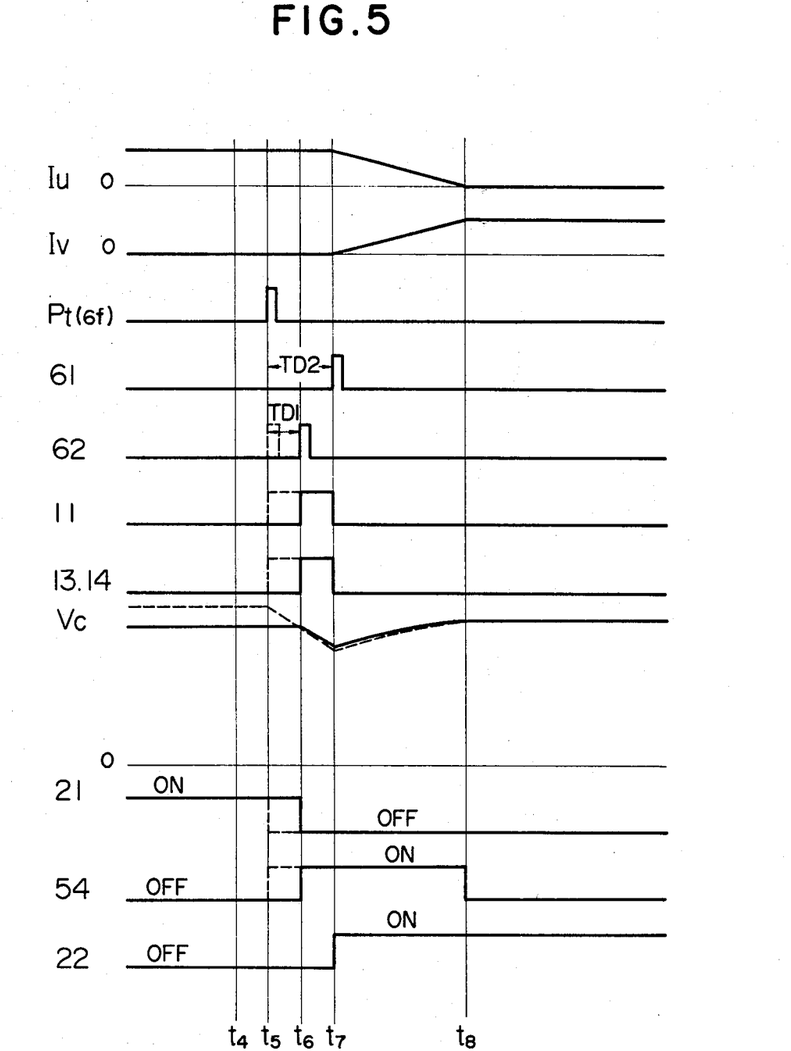
FIG. 5 is a timing chart for explaining the operation of the embodiment shown in FIG. 4.

FIG. 5 shows a preferred embodiment of the present invention, wherein circuit elements similar to those shown in FIG. 1 are designated by the same reference numerals, and detailed descriptions thereof are omitted to avoid redundancy. The embodiment shown in FIG. 4 comprises an oscillator 60 which generates a series of timing pulses $P_t$ at a frequency $6f$ (wherein f represents the inverter frequency) and in a phase relation wherein the timing pulses $P_t$ are generated every 60° of the inverter operation phase angle. The output of the oscillator 60 is applied to a fixed delay circuit 61 and a variable delay circuit 62. The delay circuits 61 and 62 deliver delayed outputs $TD_1$ and $TD_2$ to a timing pulse generator 65. The output of the timing pulse generator 65 is applied to an amplifier 66 which generates control signals to all gate electrodes of thyristors of the main thyristor bridge 3, auxiliary thyristor bridge 5, thyristors 11 and 12, and choppers 13 and 14.

A voltage detector 63 detects the voltage $V_C$ across the capacitor 17, to deliver an output to a comparator 64 which compares the output of the voltage detector 63 with a predetermined value, for controlling the variable delay circuit 62 in such a manner that it shortens the delay time of the delay circuit 62 when the output is larger than the predetermined value, and elongates the delay time when the output is smaller than the predetermined value.

The operation of the embodiment shown in FIG. 4 will now be described with reference to a timing chart shown in FIG. 5. At an instant $t_4$ shown in FIG. 5 and corresponding to the instant $t_0$ shown in FIG. 2, the thyristors 21 and 26 are in the ON states. When a triming pulse $P_t$ is generated in the oscillator 60 at an instant $t_5$, the pulse $P_t$ is delayed in the fixed delay circuit 61 for a fixed period $TD_2$, and the output thus delayed is applied to the timing pulse generator 65 at at instant $t_7$.

In a case where the voltage $V_C$ of the capacitor 17 is at a level shown by a solid line in FIG. 5, the variable delay circuit 62 delays the pulse $P_t$ by an amount $TD_1$, and the output thus delayed is applied to the timing pulse generator 65 at an instant $t_6$. The timing pulse generator 65 includes, for instance, a flip-flop circuit, not shown, which is set by the output $TD_1$ from the variable delay circuit 62 and reset by the output $TD_2$ from the fixed delay circuit 61. When the flip-flop circuit is set at the instant $t_6$, the thyristor 11, choppers 13 and 14, and the thyristor 54 in the auxiliary thyristor bridge 5 are all turned ON. When the thyristor 54 is turned ON at the instant $t_6$, the thyristor 21 is turned OFF to discharge the capacitor 17 for an interval $t_6$-$t_7$. Discharge of the capacitor 17 reduces its terminal voltage $V_C$. When the choppers 13 and 14 are turned OFF and the thyristor 22 is turned ON at the instant $t_7$, the charging of the capacitor 17 is started thereby reducing the current $I_U$. When the current $I_U$ is reduced to zero at an instant $t_8$, the thyristor 54 is turned OFF, whereby commutation from the current $I_U$ to the current $I_V$ is accomplished.

In another case where the capacitor voltage $V_C$ is high as shown by dotted lines at the instant $t_5$, the delay time $TD_1$ of the variable delay circuit 62 is shortened as shown by dotted lines in FIG. 5, and the choppers 13 and 14, thyristor 11, and the thyristor 54 are all held in their ON state during the interval $t_5$-$t_7$. As a result, the capacitor 17 discharges during the same interval $t_5$-$t_7$ as shown by the dotted line, and then is charged as described above for an interval $t_7$-$t_8$.

As above described, the voltage $V_C$ of the capacitor 17 is controlled in such a manner that when the voltage $V_C$ is higher than a predetermined value, the discharge interval of the capacitor 17 is elongated, and when the voltage $V_C$ is lower than the predetermined value, the discharge interval of the capacitor 17 is shortened. Regardless of the above described control of the capacitor voltage $V_C$, however, the starting instant $t_7$ of the commutation is left unchanged because the instant $t_7$ is determined by the output of the fixed delay circuit 61. As a result, the hereinbefore described instability of operation can be eliminated even in a case where an AC motor is connected to the output of the current type inverter.

Figure 6:
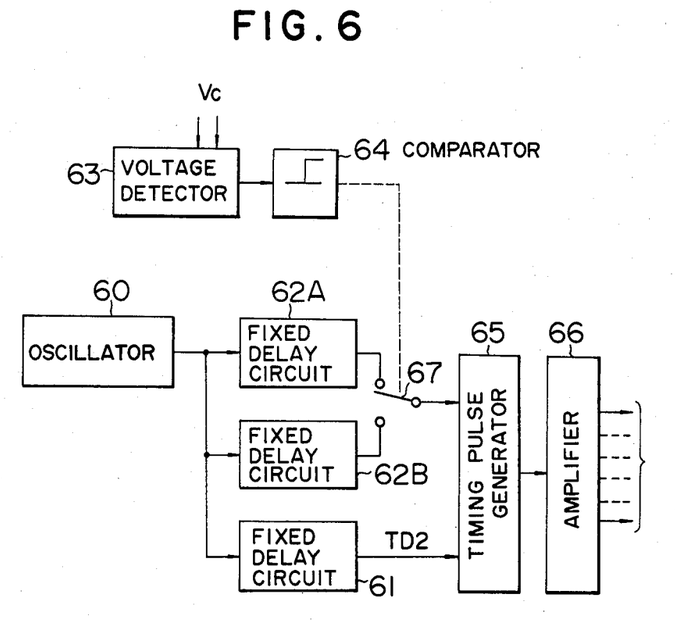
FIG. 6 is a block diagram showing another embodiment of the invention.

Although one fixed delay circuit 61 and one variable delay circuit 62 have been utilized in the aforementioned embodiment, the variable delay circuit 62 may otherwise be replaced by two fixed delay circuits 62A and 62B having different delay times $TD_{1A}$ and $TD_{1B}$, respectively as shown in FIG. 6. In such embodiment, a transfer switch 67 is provided for applying either one of the outputs of the two delay circuits 62A and 62B to the timing pulse generator 65 in accordance with the operation of the transfer switch 67 controlled by the output of the comparator 64. If desired, the number of the fixed delay circuits may be increased beyond two.

Figure 7:
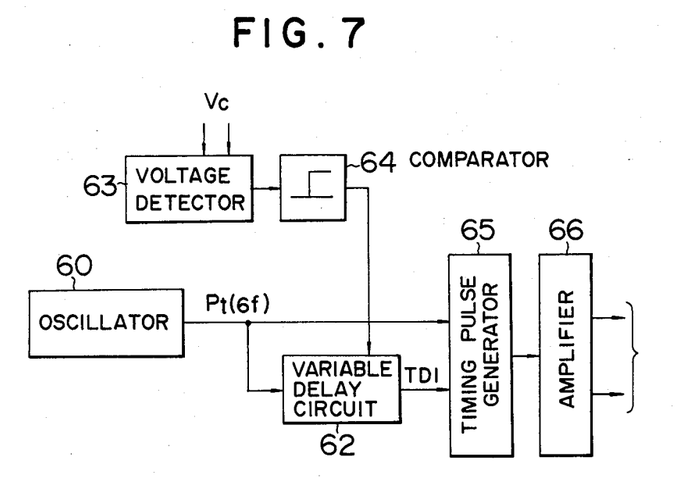
FIG. 7 is a block diagram showing still another embodiment of the invention.

In still another embodiment shown in FIG. 7, only the variable delay circuit 62 of the embodiment shown in FIG. 4 is sued, and the delay time $TD_1$ of the delay circuit 62 is elongated in proportion to the capacitor voltage $V_C$. In addition, the timing pulse $P_t$ is further applied directly to the timing generator 65, so that the flip-flop circuit included in the timing pulse generator 65 is set by the timing pulse $P_t$ and reset by the output pulse from the variable delay circuit 62. Thus, the ON-OFF control of the choppers 13 and 14 is carried out in response to the operation of the flip-flop circuit, and the charging interval of the capacitor 17 is varied as indicated by $t_5$-$t_6$ and $t_5$-$t_7$ in FIG. 8, for example.

Figure 8:
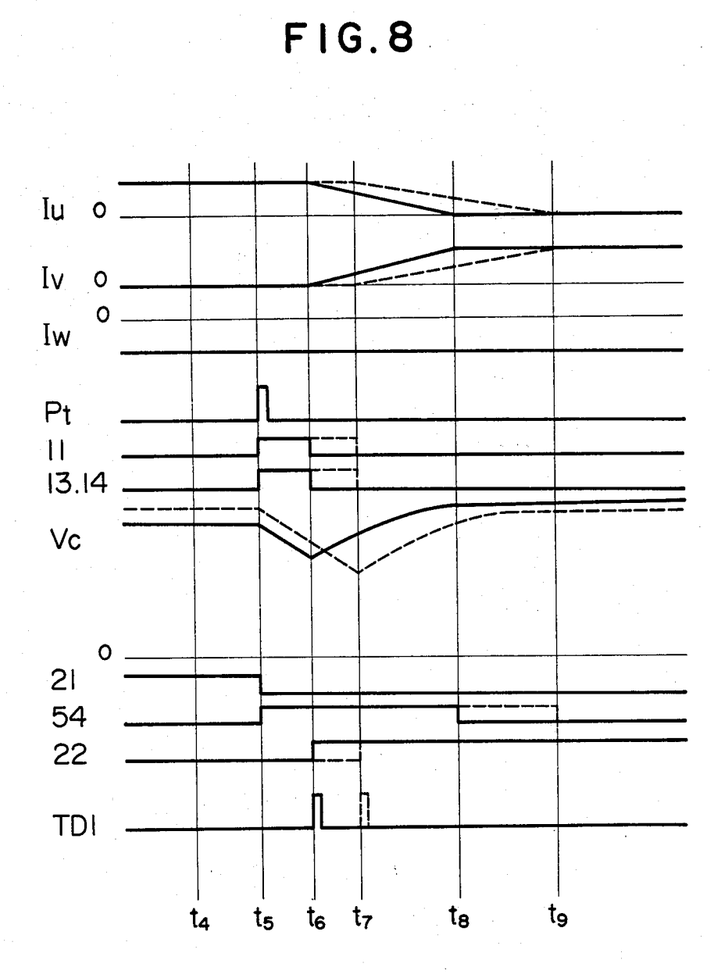
FIG. 8 is a timing chart useful to explain the operation of the embodiment shown in FIG. 7.

In the embodiment shown in FIG. 7, as will be apparent from FIG. 8, the starting time instant of the commutation varies as shown by $t_6$ and $t_7$, and therefore the load current tends to contain a DC component rendering the operation of the electric motor unstable. For this reason, the delay time $TD_1$ must be reduced to a small value. If it is required to increase the delay time $TD_1$, the variation of commutation phase angle must be reduced by restricting the variation of the delay time for each commutation, so that the operation of the electric motor is made stable.

In the above described embodiments, the capacitor 17 may be replaced by a DC power source which can be charged or discharged, for example a storage buttery. Accordingly, the term "capacitor" in the appended claims is used to also include such charge and dischargeable DC source.

According to the present invention, the commutating operation of the inverter is carried out while controlling the discharging interval of a capacitor so that a substantially constant capacitor voltage can be obtained regardless of the load condition. As a result, an electric motor can be used as a load of the inverter without suffering from a surge voltage or commutation failure, and any variation of the commutation phase angle can be prevented. Furthermore, in a current type inverters in which a diode and a thyristor are connected in series in each branch, there are various problems as follows. Thus, variation in the load inductance causes a surge voltage, change of the load motor or its rating requires switching of the commutation capacitors and rapid variation of the load varies the commutation timing thus rendering unstable the operation of the inverter. However, according to this ivention all of these problems can be overcome.

I claim:

1. In a commutation control device for a current type inverter of the type wherein commutation energy of a load of the inverter is stored in a capacitor, and subsequent commutation is effected utilizing discharge of said capacitor, the improvement comprising means for detecting a voltage across said capacitor when it is charged and means for controlling a length of discharge interval of said capacitor during said subsequent commutation depending on the detected capacitor voltage so as to maintain the capacitor voltage at a substantially constant value.

2. A commutation control device as set forth in claim 1 wherein said means for detecting the capacitor voltage includes a comparator for comparing the detected capacitor voltage with a predetermined value, the delivering a first output when the detected capacitor voltage is larger than the predetermined value, while delivering a second output when the detected capacitor voltage is less than the predetermined value.

3. A commutation control device as set forth in claim 1 wherein said means for detecting the capacitor voltage includes a comparator which delivers an output substantially proportional to the capacitor voltage.

4. A commutation control device as set forth in claim 2 wherein said means for controlling the discharge interval includes a pulse generator, a variable delay circuit for delaying a pulse received from said pulse generator depending on an output of said comparator, a fixed delay circuit for delaying a pulse received from said pulse generator for a fixed delay time, and a timing pulse generator connected to receive outputs of said variable delay circuit and said fixed delay circuit for generating a timing pulse utilized to control in discharge interval of said capacitor.

5. A commutation control device as set forth in claim 2 wherein said means for controlling the discharge interval includes a pulse generator, a plurality of fixed delay circuits for delaying pulses received from said pulse generator for different delay times, a transfer switch for delivering either one of outputs from said plurality of fixed delay circuits to a timing pulse generator, a further fixed delay circuit for delaying a pulse received from said pulse generator for a fixed delay time, said timing pulse generator being connected to receive an output from said further fixed delay circuit for generating a timing signal adapted to control the discharge interval of the capacitor.

6. A commutation control device as set forth in claim 3 wherein said means for controlling the discharge interval includes a pulse generator, a variable delay circuit for delaying a pulse received from said pulse generator for a delay time variable in accordance with the output of said comparator in said voltage detecting means, and a timing pulse generator connected to receive a pulse from said pulse generator and an output pulse from said variable delay circuit for generating a timing signal for controlling the discharge interval of the capacitor.

* * * * *